United States Patent [19]

Gavrilova et al.

[11] 4,027,082

[45] May 31, 1977

[54] POWDERY HYDROPHILIC FILLERS

[75] Inventors: Ivana Gavrilova; Slavko Hudecek, both of Prague, Czechoslovakia

[73] Assignee: Ceskoslovenska akademie ved, Prague, Czechoslovakia

[22] Filed: July 21, 1975

[21] Appl. No.: 597,559

Related U.S. Application Data

[63] Continuation-in-part of Ser. No. 372,997, June 25, 1973, abandoned.

[30] Foreign Application Priority Data

June 26, 1972 Czechoslovakia .................. 4518/72

[52] U.S. Cl. .............................. 526/15; 260/37 R; 526/16; 526/208; 526/209; 526/210; 526/212; 526/217; 526/271; 526/292; 526/317; 526/909

[51] Int. Cl.² ...................... C08F 8/44; C08F 2/14

[58] Field of Search ....... 260/78.5 BB, 80 P, 80 M, 260/80.8, 37 R; 526/208, 209, 210, 212, 217, 317, 292, 15, 16, 909, 271

[56] References Cited

UNITED STATES PATENTS

| | | | |
|---|---|---|---|
| 2,923,692 | 2/1960 | Ackerman et al. | 260/17.4 |
| 3,313,748 | 4/1967 | Burke | 260/4 |
| 3,530,102 | 9/1970 | Welch et al. | 260/78.5 |
| 3,586,646 | 6/1971 | Corte et al. | 260/2.2 R |

Primary Examiner—John Kight, III

[57] ABSTRACT

There is disclosed a process for producing carboxyl-containing hydrophilic polymeric fillers comprising polymerizing at least one carboxyl-containing monomer with a cross-linking monomer in an oxygen bearing organic solvent for the monomers and in the presence of a free radical catalyst to form a polymeric precipitate and treating the thus formed polymeric precipitate with a solution containing sodium, potassium or ammonium ions thereby transforming the same into the corresponding polymeric salt, said solvent being a non-solvent for the polymer.

12 Claims, No Drawings

POWDERY HYDROPHILIC FILLERS

CROSS REFERENCE TO RELATED APPLICATION

This present application is a continuation-in-part of our previously filed application, Ser. No. 372,997, filed on June 25, 1973, now abandoned.

BACKGROUND OF THE INVENTION

This invention relates to a process for producing powdery fillers having hydrophilic properties, said fillers being prepared from crosslinked polymers. The invention also relates to the polymeric product produced by the method and to the novel fillers as well as to uses therefor.

The use of fillers is broadly employed in the plastics processing industry. The addition thereof to plastics gives to the resulting material further desired properties which the starting material does not possess. Thus, for example, impact strength can be substantially enchanced by including fibrous fillers; thermal stability by including mineral fillers and so on. Recently, a certain degree of hydrophility has been required in some types of plastics used as substitutes for natural leather. In the latter case, this means the ability to absorb water vapors at higher concentration in air and to desorb the same rapidly and if possible, quantitatively with a decreased concentration in air. The foregoing rapid sorption and desorption is one of the principal characteristic features of natural leather and is most important from the hygienic standpoint.

Several natural materials occur which possess similar hydrophilic properties such as, for example, wood, cellulose, starch and the like. The sorption capacity of these materials, however, which are also used as fillers, is rather low, i.e., having a range of 15 to 25% of absorbed water vapor calculated on the dry material, which corresponds to a value identical with the sorption of natural leather. Consequently, only very limited progress has been achieved by the application of these materials, as additives, to increase the hydrophility of plastics, even if one ignores the fact that the physical and mechanical properties of the product are sacrificed by the application thereof due to the necessity of the high quantity of filler needed.

Synthetic polymers of the instant invention provide entirely new possibilities for the application disclosed. Their properties, i.e., hydrophility, can be varied over a considerably wide range, i.e., they can be "tailor made". Heretofore, they have not been prepared in a sufficiently fine-grained form such that they appreciably would not influence the appearance of the finished material. In the past, disintegration and grinding have been successful only in part, and then only under rather difficult conditions, i.e., with deep cooling of the ground material by means of liquid nitrogen and the like.

A number of patents have involved the copolymerization of carboxyl-containing monomers with various other monomers, but these patents are non-applicable to our present invention.

U.S. Pat. No. 2,923,692 relates to salts of crosslinked carboxylic polymers, wherein the formed salts are highly swollen mucilage existing only in aqueous medium. They are obtained by the copolymerization of an olefinically unsaturated carboxylic acid with a conjugated unsaturated compound in a hydrocarbon solvent. The conjugated unsaturated compound has a concentration of 0.1 to 10%. This patent does not provide a means for the isolation of the salt from its swollen state in the aqueous medium. Furthermore, at the concentration level of 0.1 to 10% of crosslinking agent, the resulting copolymer is not a solid but rather a gumlike mass which is not suitable as a filler in other polymeric materials.

U.S. Pat. No. 3,586,646 relates to the formation of terpolymers having an acid group thereon, wherein these polymers are used as cation exchange resins. The copolymers of the present invention are not terpolymers.

U.S. Pat. No. 3,530,102 relates to terpolymers formed from maleic anhydride, divinyl benzene and vinyl alkylether; which terpolymers are not related to the salts of the copolymer of the present invention.

Canadian Pat. No. 592,794 relates to the copolymerization of an $\alpha$-$\beta$-ethylenedicarboxylic acid derivative such as esters with aliphatic conjugated diolefins such as butadiene, which are not capable of crosslinking reactions and therefore the resulting linear polymers are soluble in toluene as clearly defined in the claims. The resulting copolymers are soft tacky masses as clearly shown in the examples, which are not suitable as fillers as are the solid copolymers of the present invention.

SUMMARY OF THE INVENTION

It is an object of the instant invention to avoid one or more drawbacks of the prior art.

It is another object of the invention to provide for hydrophilic synthetic polymers and a method of making the same.

It is still another object of the invention to provide for fillers for plastics based upon the hydrophilic polymers above referred to.

It is a further object of the invention to provide for plastic materials including the above fillers.

These and other objects of the invention will become more apparent from the following detailed description.

DESCRIPTION OF THE INVENTION

Broadly speaking, the invention includes the provision of a process for producing a carboxyl-containing hydrophilic polymeric filler comprising polymerizing (a) at least one carboxyl-containing monomer with (b) a crosslinking monomer in an oxygen bearing organic solvent for the monomers and in the presence of (c) a free radical catalyst to form a polymeric precipitate, and treating the thus formed polymer precipitate with (d) a solution containing sodium, potassium or ammonium ions thereby transforming the same into the corresponding polymeric salt, said solvent being a nonsolvent for the polymer.

The process contemplates producing the powdered hydrophilic fillers by copolymerizing a monomer containing one or more carboxylic groups or groups easily convertible into carboxylic groups, i.e., anhydrides or acyl chlorides, or a mixture of such monomers with more than 5%, preferably 5 to 20%, of a crosslinking agent based on the weight of these monomers, in an oxygen bearing organic solvent or a mixture of such solvents for the monomers but a non-solvent for the copolymer. The concentration of the aforesaid monomers is in the range of about 5.0 to about 60%, preferably 10 to 25% on the weight of the monomer. A suitable polymerization catalyst is employed in an amount of 0.01 to 3% by weight based on the total mixture.

Subsequent to the polymerization reaction, which is conducted at a temperature of about 10° C to 150° C, preferably 30° to 70° C., the resulting precipitate of the polymer having a particle size below 100 μm, is transformed into its sodium, potassium or ammonium form in a solvent or a mixture of solvents of the same properties as given above. This transformation is carried out directly in the polymerization solvent system preferably immediately after completion of the polymerization.

The monomer containing the carboxylic functionalities or groups is preferably acrylic or methacrylic acid, fumaric acid or maleic acid, or the anhydrides, acid chlorides or the like derived therefrom. Other suitable operative olefinically unsaturated mono-carboxylic acids include those containing 3 to 8 carbon atoms, i.e. crotonic acid, α-chlorocrotonic acid, iso-crotonic acid, cis-2-butenoic acid, hydrosorbic acid, α-chloroacrylic acid, ethacrylic acid, vinyl thiophenic acid, α-furylacrylic acid, vinyl furoic acid, sorbic acid, α-methyl sorbic acid, α-ethyl sorbic acid, α-chloro sorbic acid, α-bromo sorbic acid, β-chloro sorbic acid, α,β-dimethyl sorbic acid and the like; olefinically unsaturated polycarboxylic acids include fumaric, maleic, citraconic, mesaconic, itaconic, teraconic, aconitic, ethyl maleic, methyl itaconic, muconic, hydromuconic, glutaconic, and 3-carboxy-pentadiene-(2,4)-oic-1 acids, the dimer and trimer of methacrylic acid and other monoolefinic and polyolefinic polycarboxylic acids, as well as their corresponding anhydrides, acid chlorides and like derivatives.

As a crosslinking agent, the monomers containing more than one vinyl group are preferred, i.e., divinylbenzene, ethylene glycol dimethacrylate, diethylene glycol dimethacrylate, and the like.

Other suitable crosslinking agents include glycol divinylester, divinyl adipate, allyl vinyl ether, diallyl fumarate, triallyl cyanurate and the like.

The transformation of the polymeric reaction product into the corresponding Na, K or NH$_4$ form is advantageously carried out at ambient temperature by means of aqueous or alcoholic solutions of the above hydroxides, hydrogen carbonates, carbonates, or alcoholates. The percent concentration of the foregoing solution is preferably about 5 to 40%.

The particle size, the porosity thereof and also the surface area thereof can be controlled to some extent by varying the monomer concentration and the solvent system; products having varying thickening capacities result in this way.

Suitable polymerization catalysts include the free radical initiators customarily employed in solvent polymerization. They generally include organic solvent soluble radicals. Azo type catalysts, i.e., compounds containing the azo linkage, may also be employed. As examples of such catalysts there may be mentioned α,α'-azobis-(α,γ-dimethyl-valeronitrile), α,α'-azobis-(α-methyl butyronitrile), α,α'-azobis-(α-ethyl butyronitrile), α,α'-azo-diisobutyramide, dimethyl and diethyl, α,α'-azodiisobutyrate, and the like.

Suitable organic solvents include esters, ethers, alcohols, ketones, dimethyl formamide and hydrogenated derivatives of furanes, and their mixtures.

The sorption of water vapor from the air depends, of course, upon the degree of concentration of the neutralized carboxylic groups of the hydrophilic fillers prepared according to the invention, and generally ranges from about 50 to about 150% w/w calculated on the dry filler. Sorption istherms have a suitable course due to the fact that the maximum increase in sorption of water vapor is situated between 50 and 100% of relative air humidity.

The following examples are given to illustrate the above-described invention; they are not to be considered as limiting the scope of the invention. All parts, proportions and percentages in the following examples, as well as in the appended claims are by weight unless otherwise specified.

EXAMPLE 1

A 250 ml three necked flask, which was equipped with a thermometer, reflux condenser, stirrer, and nitrogen inlet tube, was charged with

| propanol | 65 | ml |
|---|---|---|
| methacrylic acid | 37.5 | g |
| glycol dimethacrylate | 3.5 | g |
| azobisisobutyronitrile | 0.35 | g |

Nitrogen was bubbled through the mixture for 10 minutes, and the mixture was then heated to 65° C. The polymerization was carried out at this temperature under continuous stirring in a nitrogen atmosphere for 7 hours. After completion of the polymerization, 75 ml of sodium ethoxide, prepared by dissolving of 8.42 g of sodium metal in 75 ml of ethanol, was added under continuous stirring to the suspension of the precipitated polymer. The resulting suspension was first dried in air and then in a vacuum oven at 70° C and a pressure of 10 mm Hg.

EXAMPLE 2

A solution of sodium butoxide in butanol (0.34 g Na in 60 ml of butanol) was added to a suspension of the polymeric precipitate, which precipitate resulted from the polymerization of a mixture of:

| maleic acid | 16 | g |
|---|---|---|
| glycol dimethacrylate | 4 | g |
| butanol | 80 | ml |
| dibenzoyl peroxide | 0.6 | g |

The suspension was stirred for one hour, then sucked dry on a glass filter and dried first in air and then in a vacuum oven at 65° C to constant weight.

What is claimed:

1. A process for producing a powdered hydrophilic solid carboxylic-containing polymeric filler, which comprises providing a mixture of (a) at least one monomer comprising a mono- or poly-olefinically unsaturated mono- or poly-carboxylic acid, the anhydride thereof, or the acid chloride thereof and (b) at least 5% based on the weight of monomer (a) of a crosslinking monomer containing more than one vinyl group in an oxygen bearing organic solvent including (c) a free radical catalyst, polymerizing said monomer mixture for a time and at a temperature sufficient to form a particulate solid polymeric precipitate, said oxygen bearing organic solvent being a solvent for said monomers (a) and (b) but a non-solvent for said solid polymeric precipitate, the relative proportions of said monomer mixture and said oxygen bearing organic solvent being such that the particle size of said solid polymeric precipitate is less than 100 μm, directly treating said solid polymeric precipitate in the polymerization system with (d) a solution containing sodium, potassium or ammonium ions for a time sufficient to transform the solid polymeric precipitate into the corresponding solid polymeric salt, said solution being a non-solvent for said solid polymeric precipitate and its salt, and thereafter separating and drying said solid polymeric salt into a solid particulate powder.

2. A process as defined in claim 1 wherein unit (a) is selected from the group consisting of acrylic and methacrylic acids, fumaric acid, maleic acid, the anhydrides and acid chlorides thereof.

3. A process as defined in claim 1 wherein unit (b) is selected from the group consisting of divinyl benzene, ethylene glycol dimethacrylate and diethylene glycol dimethacrylate.

4. A process as defined in claim 1 wherein unit (c) is an organic soluble free radical catalyst.

5. A process as defined in claim 1 wherein said oxygen bearing solvent is selected from the group consisting of esters, ethers, alcohols, ketones, dimethyl formamide and hydrogenated derivatives of furanes and mixtures thereof.

6. A process as defined in claim 1 wherein unit (d) is either an aqueous or an alcoholic solution.

7. A process as defined in claim 6 wherein unit (d) contains the corresponding hydroxide, hydrogen carbonate, carbonate or alcoholate.

8. A process as defined in claim 1 wherein unit (d) is a solvent for said monomers (a) and (b).

9. A process as defined in claim 1 wherein unit (a) is present in amounts of about 5 to about 60% by weight.

10. A process as defined in claim 1 wherein unit (c) is present in amounts of about 0.01 to about 3% by weight based upon the total mixture.

11. A process as defined in claim 1 wherein said polymerization is carried out at temperatures ranging from about 10 to about 150° C and said treating step is carried out at ambient temperature.

12. A powdered hydrophilic solid carboxylic-containing polymeric filler produced in accordance with the process as defined in claim 1.

* * * * *